April 17, 1945. V. E. MATULAITIS 2,373,903
POWER TRANSMISSION
Filed May 17, 1943 3 Sheets-Sheet 1

INVENTOR.
Victor E. Matulaitis.
BY
ATTORNEYS.

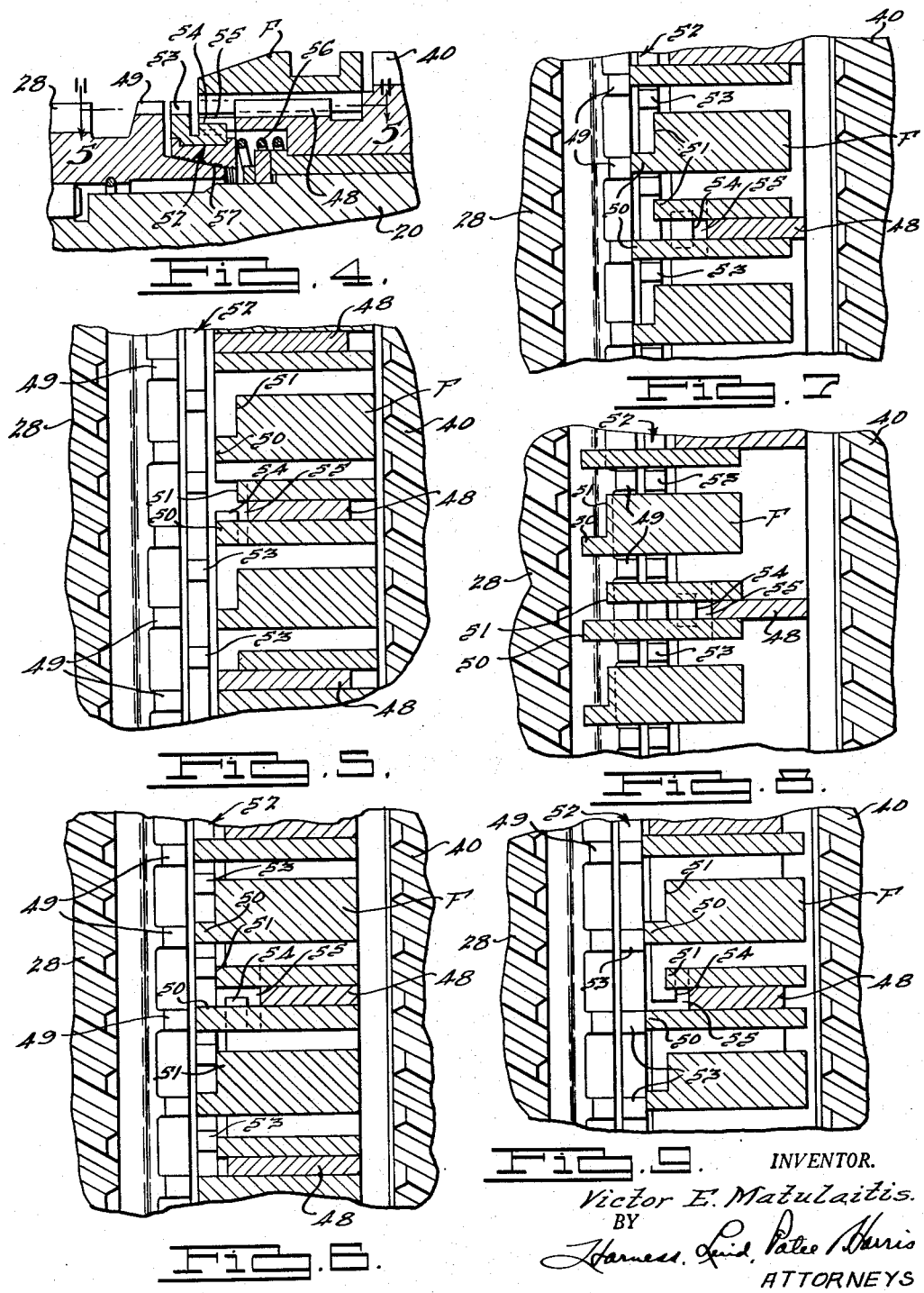

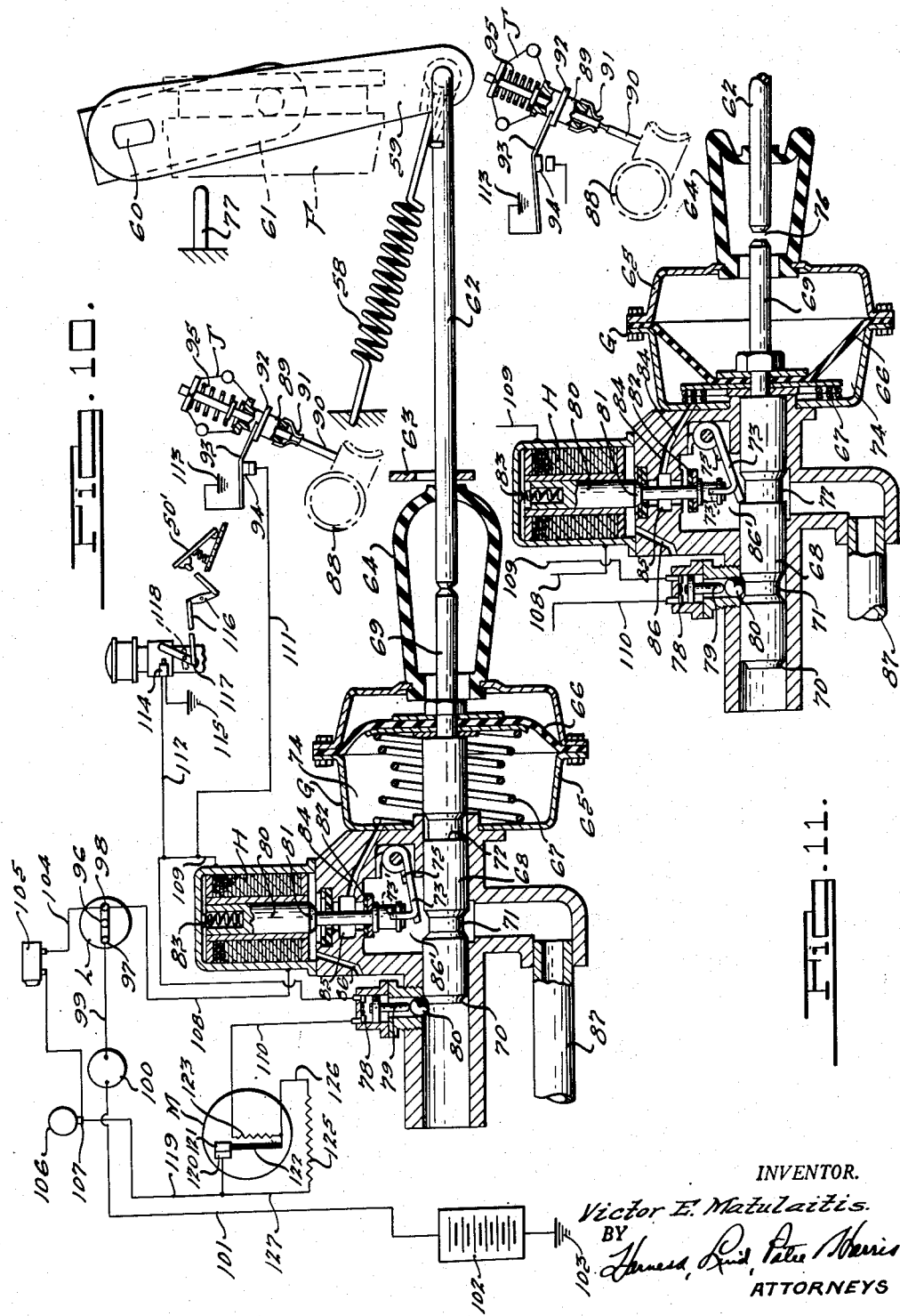

Patented Apr. 17, 1945

2,373,903

UNITED STATES PATENT OFFICE 2,373,903

POWER TRANSMISSION

Victor E. Matulaitis, Detroit, Mich., assignor to Chrysler Corporation, Highland Park, Mich., a corporation of Delaware Application May 17, 1943, Serial No. 487,251

15 Claims. (Cl. 74—472)

This invention relates to motor vehicles and refers more particularly to power transmission and control mechanism therefor.

My invention has particular reference to transmission systems in which the engine ignition is momentarily interrupted in order to unload positively engageable drive control elements so as to facilitate disengagement of such elements. One example of such a transmission is described and claimed in the copending application of Carl A. Neracher et al., Serial No. 335,310, filed May 15, 1940. In such transmission systems, the engine ignition sometimes is grounded beyond the desired momentary period either as a characteristic of the transmission control mechanism, because of failure of the mechanism to properly function, or for other reasons. When the ignition system is thus interrupted, usually by grounding the same, the engine is often rendered inoperative so that the car cannot be driven under its own power, or the change speed mechanism does not function properly.

It is an object of my invention to provide means for remedying the foregoing difficulties whereby the engine ignition is automatically restored after a predetermined time of interruption regardless of the proper functioning of the transmission control mechanism which is ordinarily provided for momentarily interrupting the ignition system.

Another object is to provide time control means for restoring the engine to normal functioning in the event that the primary engine interrupting system fails to restore the engine to normal functioning.

A further object is to provide means for definitely controlling the time of ignition interruption occasioned by the usual transmission control mechanism so that the time of ignition interruption is fixed and independent of the time taken to complete a cycle of the primary ignition interrupting means.

Another object is to provide an improved control for an engine ignition system whereby the interruption of the ignition will occur during only one direction of shift of a transmission change-speed shifter member, preferably in a direction for down-shift or step-down control, and not in the other direction of shift.

An additional object is to provide thermo-responsive means operating under control of an ignition interrupter switch for automatically restoring the ignition to normal operation in the event that the interrupter switch fails to itself restore the ignition within a predetermined time limit, in conjunction with means operating under control of the interrupter switch for keeping the thermo-responsive means energized once it has operated to restore the ignition so that, as long as the interrupter switch fails to function properly, the thermo-responsive means will not "hunt" by operating through repeating cycles of restoring and interrupting the ignition.

Further objects and advantages of my invention will be more apparent from the following illustrative embodiment thereof, reference being had to the accompanying drawings in which:

Fig. 4 is a detail enlarged view of the blocker clutch as seen in Fig. 3.

Fig. 5 is a sectional plan view illustrated as a development according to line 5—5 of Fig. 4, the automatic clutching sleeve being released.

Fig. 6 is a similar view showing the automatic clutching sleeve in its intermediate shift position during the drive blocking condition.

Fig. 7 is a similar view showing the automatic clutching sleeve in its coasting relationship from the Fig. 6 showing, the clutching sleeve being unblocked during coast for its clutching movement.

Fig. 8 is a similar view showing the automatic clutching sleeve in full clutching engagement.

Fig. 9 is a view similar to Fig. 5 but showing the automatic clutching sleeve in its other intermediate shift position during the coast blocking condition.

Fig. 10 is a diagrammatic view of the control mechanism for the automatic clutching sleeve, the latter being shown in its released position.

Fig. 11 is a similar view of a portion of the Fig. 10 control mechanism in another operating position.

Figures 1, 2, 3:
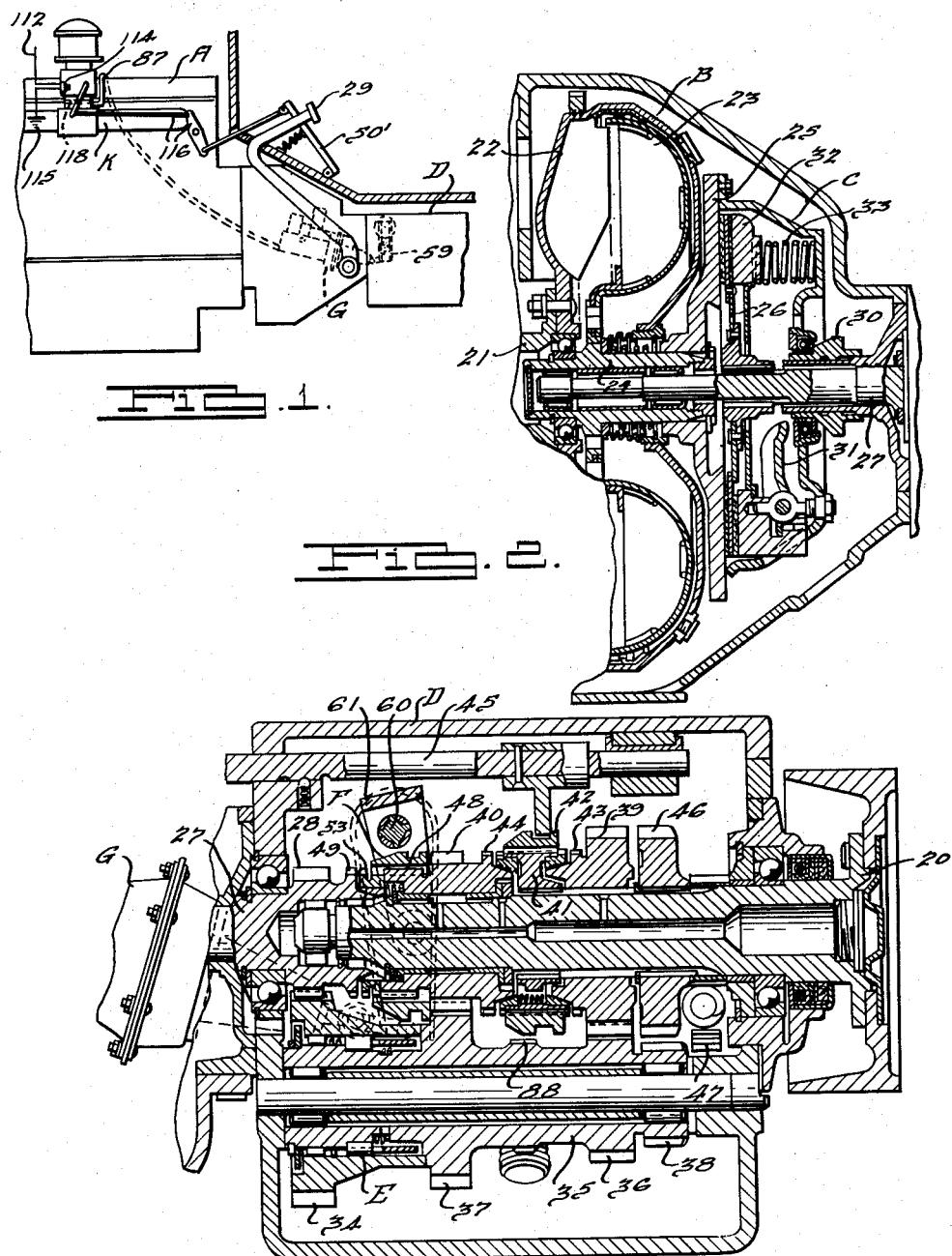
Fig. 1 is a side elevational view showing the motor vehicle engine and power transmission.
Fig. 2 is a longitudinal sectional elevational view through the main clutching mechanism.
Fig. 3 is a similar view through the change speed transmission.

While this control may be employed in conjunction with various types and arrangements of motor vehicle transmissions, in order to illustrate one driving system the invention is shown in connection with certain salient parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make manual shifts in transmission D.

Referring to the transmission, pinion 28 is in constant mesh with gear 34 which drives countershaft 35 through an overrunning clutch E of the usual type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A through fluid coupling B, clutch C and shaft 27 to pinion 28 thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutching shaft 27 directly to gear 40. This sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50' thereby closing the engine throttle valve and allowing the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to aproximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocking ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

During driving in first and third, the speed of shaft 27 exceeds the speed of gear 40 so that, if sleeve F is fully released, the parts will be positioned as in Fig. 5 wherein the blocker leads the sleeve F thereby positioning blocker teeth 53 axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution between the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on which the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manually shiftable sleeve 42. Then on releasing the accelerator pedal the sleeve F will synchronously clutch with teeth 49 during coast to step-up the drive to either second or fourth as aforesaid.

The transmission is provided with suitable motor means for controlling shift or sleeve F along with several control means. Referring particularly to Figs. 10 and 11, there is illustrated a pressure fluid operated motor G utilizing air pressure for its operation. For convenience this motor is arranged to operate by the "vacuum" in the intake manifold system of the engine under control of electromagnetic means illustrated in the form of a solenoid H.

Forward shift of sleeve F is effected, under control of motor G, by reason of a spring 58 fixed at one end and exerting a pull-on lever 59 which is connected to sleeve F through the cross-shaft 60 and shifter yoke 61. Pivoted to the lower end of lever 59 is a follower rod 62 guided in a support 63 and in the rubber sealing boot 64 carried by cylinder 65 which contains the diaphragm piston 66 urged in a direction to release sleeve F by a spring 67 which is much stronger than spring 58. Diaphragm piston 66 is connected to a leader rod 68 which has a rear extension 69 aligned with rod 62.

Rod 68 has a series of detents 70, 71 and 72, the latter cooperating with a latch 73 such that when vacuum is admitted to chamber 74 to cause the piston 66 and rod 68 to assume their Fig. 11 positions, latch 73 under action of rat-trap spring 75 catches on the forward shoulder of detent 72 and holds the parts as in Fig. 11. At this time rod portion 69 moves further than rod 62 by the amount of gap 76, a stop 77 acting on lever 59 limiting forward movement of sleeve F by spring 58.

In order to provide for release of sleeve F, it is desirable to provide some means for momentarily relieving the torque load at the teeth 49 and sleeve F and in the present instance I have provided such means as a system of grounding the primary terminal of the usual distributer of the ignition system whereby the engine ignition may be momentarily rendered ineffective thereby unloading the torque at sleeve F sufficiently to insure its release by spring 67. This ignition interrupting system is under control of an interrupter switch 78 which is closed by plunger 79 and ball 80 whenever rod 69 moves between the Fig. 10 and Fig. 11 positions by reason of the enlarged rod portion between detents 70, 71. Detent 71 is so arranged that, with the parts as in Fig. 11 and sleeve F clutched, rod 68 may move rearwardly sufficiently to close gap 76 at the lost-motion between rod portion 69 and rod 62, this movement causing switch 78 to close and ground the ignition system whereupon spring 67 may then cause further movement of rod 68 and rod 62 to release sleeve F, the switch 78 then opening by detent 70 to restore the ignition system.

The vacuum supply to chamber 74 is under control of electromagnet means in the form of a solenoid H which comprises an armature plunger 80 having valving parts 81, 82. In Fig. 10 the solenoid H is energized thereby raising plunger 80 against spring 83 to seat valve 82 and shut off the vacuum supply to chamber 74 and at the same time unseat valve 81 so as to vent this chamber through passage 84, chamber 85 and vent passage 86. When the solenoid is de-energized then spring 83 lowers plunger 80 thereby seating valve 81 to shut off vent 86 and open valve 82 as in Fig. 11 thereby opening chamber 74 to the engine intake manifold K through passage 84, chamber 86', and pipe 87.

A certain lost motion is provided between plunger 80 and the inwardly bent finger 73' of latch 73 so that when the plunger moves downwardly the latch may subsequently catch at detent 72 when vacuum operates piston 66, the parts then remaining in the Fig. 11 position independently of vacuum in chamber 74 until solenoid H is energized to release the latch and vent chamber 74.

It is deemed preferable to provide a speed control on the energization of solenoid H so as to insure automatic release of sleeve F below a predetermined car speed and automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 88 is a governor J of any suitable type, this governor operating a sleeve 89 outwardly along its drive shaft 90 as the car speed reaches a predetermined point, the breakaway being under control of a detent 91 if desired.

The sleeve 89 has a shoulder 92 engaged by the swinging switch piece 93 of the governor switch 94. When the car is stationary the detent 91 is engaged and switch 94 is closed. As the car accelerates the governor eventually reaches its critical speed and detent 91 releases thereby causing switch 94 to open. As the car slows down, the governor spring 95 restores the parts to the Fig. 10 position and by proportioning the various parts it is obvious that switch 94 may be made to function at desired speeds proportionate to car travel. As an example of one arrangement of governor operation and gearing arrangement, the governor may be made to open switch 94 during car acceleration in first and third respectively at approximately 7 and 15 M. P. H. (miles per hour), the switch 94 closing on stopping the car in direct and second at approximately 7 and 3 M. P. H. respectively.

The driver operated ignition switch is designated at L and comprises a conductor 96 which, in the Fig. 10 position showing the switch "on" or closed, electrically connects contacts 97 and 98. Contacts 97 extends by conductor 99 to ammeter 100 and thence by conductor 101 to the usual storage battery 102 and thence to ground 103. Contact 98 has a conductor 104 extending therefrom to the engine ignition system herein shown in part as comprising coil 105 and distributer 106 having a primary terminal 107.

A second conductor 108 extends from contact 98 to the solenoid H and thence by conductor 109 to one terminal of ignition interrupter switch 78, the other terminal extending by conductor 110 to timer control device M.

Branching from conductor 109 are two conductors 111 and 112, the former extending to governor switch 94 and thence to ground 113. Conductor 112 extends to kickdown switch 114 and thence to ground 115. The switch 114 is normally open and is closed preferably by a full depression of accelerator pedal 50 acting through linkage 116. When pedal 50 is thus depressed, the lever 117 which operates the engine throttle valve 118 is positioned to fully open the throttle valve, lever 117 having an upper extension which at such time closes switch 114 to effect a step-down in the transmission from fourth to third or from second to first.

The governor solenoid circuit is as follows: ground 103 to battery 102 thence by conductor 101 to ammeter 100 and by conductor 99 to ignition switch L. From switch L this circuit extends through conductor 108 and solenoid H and thence by conductors 109 and 111 to switch 94 and ground 93.

The kickdown solenoid circuit is the same as the governor solenoid circuit to conductor 109 whence this circuit extends by conductor 112 to kickdown switch 114 and ground 115.

The engine ignition circuit is the same as the governor solenoid circuit up to the ignition switch L whence this circuit extends by conductor 104 to coil 105 and distributer 106.

The ignition grounding circuit for rendering the ignition inoperative comprises a grounding conductor 119 extending from the primary terminal 107 of distributer 106 to a fixed contact 120 which is normally engaged by contact 121 carried at the outer end of a thermo-active bi-metal conductor member 122 which is fixed at its end opposite to the swinging end having contact 121. A resistance heating element 123 is disposed in thermal association with bi-metal member 122 and is electrically connected between conductor 110 and member 122. Resistance 123 is selected so that when current is passed therethrough, according to the circuit to be described, the bi-metal member 122 will deflect so as to cause contact 121 to snap away from contact 120 in a predetermined time after closing the interrupter switch 79. While this time may be varied according to the operation desired and according to the functioning of the particular transmission employed with the thermo-responsive snap-action type of timer M, I have found in practice that a time interval of around one second, for example, is desirable for the illustrated mechanism.

The ignition grounding circuit under control of the normally open interrupter switch 78 extends from the distributer 106 through conductor 119 to normally closed contacts 120 and 121 thence through bi-metal member 122, heater resistance 123 and conductor 110 to interrupter switch 78. From switch 78 this grounding circuit extends through conductor 109 and thence to a suitable ground. In the illustrated arrangement this ground is provided either at 115 through conductor 112 and kickdown switch 114 or else at 113 through conductor 111 and governor switch 94.

In the event that, for any reason, the interrupter switch 78 remains closed longer than the normal time required when rod 68 moves in its step-down direction from its Fig. 11 to its Fig. 12 position, then bi-metal member 122 operates automatically to break the ignition grounding circuit by reason of contact 121 swinging away from contact 120 whereupon the ignition system is restored to normal operation. If desired, the member 122 may be arranged to act to restore the ignition in advance of the normal stroke of rod 68. Also, if, when the parts are in the Fig. 11 position, the solenoid should be energized while sleeve F fails to release its engagement with teeth 49, then instead of the ignition system being rendered inoperative as gap 76 is taken up thereby closing switch 78 and tending to maintain the ignition system inoperative, the ignition system is grounded only so long as it takes for resistance 123 to heat bi-metal member 122 causing the ignition grounding circuit to be broken.

When the contact 121 snaps away from contact 120 to open the terminal switch M to restore the ignition, assuming the interrupter switch 78 to remain closed longer than normally desired, my invention provides electrical means automatically functioning to keep switch M open so long as switch 78 remains closed thereby preventing "hunting" at switch M by reason of its tendency to go through repeating cycles of opening, when heater 123 is energized, and closing, when heater 123 cools off. In carrying out this feature of my invention I have provided a shunt path, incorporating a resistance 125 for the flow of ignition current around the switch points 120, 121. Thus the resistance 125 is connected at one end by wire 126 to the ignition end of the heater 123 and at the other end by a wire 127 leading to switch contact 120 and distributor terminal 107 as a source of ignition current flow. This provides a shunt circuit path for flow of ignition current as follows: 119, 127, 125, 126, 123, 110, 78, 109 and thence to a ground at 113 or 115. The ohmic value of resistance 125 is selected such that it will not function to short out the ignition system and yet will allow sufficient current flow to the heater 123 to maintain switch M energized so that points 120, 121 will stay open once they have snapped open and assuming switch 78 to remain closed.

As an example of my invention, in connection with a standard automobile battery 102 of around 6 volts, the heater 123 may have around 13 ohms resistance and the resistance 125 a value of around 200 ohms. Obviously these values may be widely varied depending on results desired, available current, type of switches used, and other factors. With such an arrangement, when switch 78 closes and for some reason fails to open again, the ignition grounding circuit will be established through the heater 123 and either of the grounds 113 or 115 at switches 94 or 114. This is so because a down-shift of the transmission is called for by closing either of the switches 94 or 114 with accompanying energization of solenoid H and down-shift movement of member 68 in taking up gap 76, this in turn closing switch 78. It may be well to note that during up-shift, neither switch 94 or 114 is closed so that the ignition is not interrupted even though switch 78 is momentarily closed because no ground is provided for the ignition current. Therefore when the ignition grounding circuit is established then the ignition will will be interrupted, being restored ordinarily by the timer M or by the completion of the downshift stroke of member 68 to the Fig. 10 position. The resistance 125 is of sufficiently high ohmic value that it insures flow of the ignition current through the path of lesser resistance at 119, 120, 121, 122 and 123.

If the switch 78 should stick closed, then the switch M opens by the action of heater 123 which, of course, breaks the ignition grounding circuit and thus restores the ignition to normal operation. This is so because the high ohmic value of resistance 125 prevents disabling of the ignition system although such resistance is grounded at either 113 or 115. Furthermore resistance 125 is now in series with heater 123 and the ohmic value of resistance 125 while relatively high is nevertheless not so high but that it will not pass sufficient ignition current through the heater. This operation to keep the device M energized and the points 120, 121 separated thereby preventing their engagement so long as switch 78 remains closed. Hence the ignition system operates normally in spite of switch 78 remaining closed. Of course, when switch 78 thereafter opens then heater 123 cools down and switch M closes but switch 78 being open, the ignition continues to function normally.

I have therefore provided electrical means, including heater 123 and normally open switch 78, functioning under control of the interrupter switch such that when the thermo-responsive device operates to open the normally closed switch 120, 121, this switch 120, 121 will remain open as long as switch 78 is closed and, of course, assuming that wire 109 is grounded.

Ordinarily, the thermo-responsive timer which is diagrammatically illustrated, is a unit within a casing or housing (indicated by the circle M) whereby the heat developed by the heater 123 is retained in the casing in association with the bi-metal element 122. Such arrangement facilitates the operation of the resistance 125 in bleeding sufficient ignition current to the heater 123 to maintain it in open position as aforesaid, while preventing undesired disabling of the ignition system when switch 78 is stuck closed.

In the aforesaid Neracher et al. application there is set forth certain circumstances under which the transmission becomes locked-up with sleeves F and 42 clutched and under torque load and with gap 76 taken up so as to render the engine ignition inoperative. With my invention the ignition system is automatically restored under such conditions making it possible for the engine to operate and unload the teeth of sleeve F so that the same may then be released by spring 67 thereby opening switch 78 and restoring the system to normal operation.

In the operation of the mechanism, the car at standstill and with the ignition switch L closed and the engine idling will cause the solenoid H to be energized as in Fig. 10 because governor switch 94 is closed thereby establishing the governor solenoid circuit. Cylinder 74 is vented and sleeve F disengaged. The driver shifts sleeve 42 to either the high or low range and accelerates the car ordinarily above the critical speed of governor J thereby causing switch 94 to open to break the governor solenoid circuit. As vacuum builds up in the engine intake manifold K, plunger 80 now being lowered by spring 83 because switch 94 is open, piston 66 will be operated by vacuum thereby moving rod 68 to its Fig. 11 latched position. As soon as the driver allows the engine to coast, sleeve F will engage teeth 49 synchronously, to step-up the drive to either second or fourth although the step-up will be delayed until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor J directs a downshift on bringing the car to rest. Thus there is automatically provided a favorable torque-multiplying gearing for starting, as in third.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is fully depressed for the kickdown, switch 114 closes thereby energizing the kickdown solenoid circuit and causing solenoid H to raise plunger 80 and release latch 73 thereby venting chamber 74. At this time the sleeve F is under driving torque from the engine operating under wide open throttle. However, when latch 72 is released, spring 67 operates rod 68 rearwardly sufficiently to close gap 76 thereby closing the interrupter switch 78 and causing the ignition grounding circuit to ground the engine ignition system. This relieves the torque at sleeve F and spring 67 operates to release the sleeve whereupon the ignition is restored at detent 70, and the engine quickly speeds up to engage overrunning clutch E for establishing the third or first driving ratio depending on the setting of sleeve 42 prior to the kickdown operation.

On bringing the car to a stop when sleeve F is clutched as in fourth for example, the governor J opens governor switch 94 so as to de-energize solenoid H, vent chamber 74 and cause release of sleeve F so that the car will be started in third, assuming the manual sleeve 42 to be left in its forward high range shift position.

If the sleeve F should not release when gap 76 is taken up, or if for any reason the switch 78 remains closed longer than normal, then the timer device M will automatically function, within a predetermined time from the closing of interrupter switch 78, to break the primary ignition grounding circuit and to restore and maintain the ignition system so long as switch 78 remains closed.

If desired, the relationship of heating resistance element 123 and bi-metal member 122 may be such that contact 121 moves away from contact 120 ahead of the normal restoring operation of switch 78 to its open position when rod 68 moves between its Fig. 10 and Fig. 11 positions.

I claim:

1. In a control for an ignition system of an internal combustion engine; a grounding circuit for momentarily disabling said ignition system and including a normally open switch and a normally closed switch; said switches being arranged in series with each other in said grounding circuit; said normally open switch being adapted for successive closing and opening movements whereby to effect said momentary disabling of said ignition system; heat-responsive means for opening said normally closed switch; heating means for said heat-responsive means energized by closure of said normally open switch; and electrical circuit means, including said heating means, operating to maintain said heat-responsive means energized and therefore said normally closed switch open as long as said normally open switch remains closed.

2. In a control for an ignition system of an internal combustion engine; a grounding circuit for momentarily disabling said ignition system and including a normally open switch and a normally closed switch; said switches being arranged in series with each other in said grounding circuit; said normally open switch being adapted for successive closing and opening movements whereby to effect said momentary disabling of said ignition system; heat-responsive means for opening said normally closed switch; heating means for said heat-responsive means energized by closure of said normally open switch; and electrical circuit means, including said heating means, automatically acting in response to failure of said normally open switch to open after it has closed as aforesaid, to maintain said heat-responsive means energized thereby serving to prevent grounding of said ignition circuit by reason of said normally open switch being maintained closed.

3. In a control according to claim 1; said electrical circuit means comprising a resistance shunted around said normally closed switch, said resistance being of such ohmic value as to prevent undesired disabling of said ignition system when said normally open switch is closed and said normally closed switch is open while allowing sufficient flow of ignition current to said heating means so as to maintain said normally closed switch open as aforesaid.

4. In a control according to claim 2; said electrical circuit means comprising a resistance shunted around said normally closed switch, said resistance being of such ohmic value as to prevent undesired disabling of said ignition system when said normally open switch is closed and said normally closed switch is open while allowing sufficient flow of ignition current to said heating means so as to maintain said normally closed switch open as aforesaid.

5. In a control for an ignition system of an internal combustion engine; a variable speed transmission adapted to be driven by said engine and having an element operably associated therewith for shift whereby to alter the drive setting of said transmission; a shifter member adapted to control shift of said shiftable element; a grounding circuit for momentarily disabling said ignition system thereby to facilitate said shift of said shiftable element, including a normally open switch operably associated with said shifter member and a normally closed switch, lost-motion means operably connecting said shifter member with said shiftable element such that in preparation for effecting an alteration in the drive setting of said transmission said shifter member has an initial shift movement independent of shift of said shiftable element thereby to effect closure of said normally open switch and establishment of said grounding circuit; means responsive to said initial shift movement of said shifter member for closing said normally open switch; heat-responsive means interposed in said grounding circuit for opening said normally closed switch within a predetermined time subsequently to closure of said normally open switch; heating means for said heat-responsive means energized by closure of said normally open switch; and electrical circuit means, including said heating means, operating to maintain said heat-responsive means energized and therefore said normally closed switch open as long as said normally open switch remains closed.

6. In a control for an ignition system of an internal combustion engine; a variable speed transmission adapted to be driven by said engine and having an element operably associated therewith for shift whereby to alter the drive setting of said transmission; a shifter member adapted to control shift of said shiftable element; a grounding circuit for momentarily disabling said ignition system thereby to facilitate said shift of said shiftable element, including a normally open switch operably associated with said shifter member and a normally closed switch, lost-motion means operably connecting said shifter member with said shiftable element such that in preparation for effecting an alteration in the drive setting of said transmission said shifter member has an initial shift movement independent of shift of said shiftable element thereby to effect closure of said normally open switch and establishment of said grounding circuit; means responsive to said initial shift movement of said shifter member for closing said normally open switch; heat-responsive means interposed in said grounding circuit for opening said normally closed switch within a predetermined time subsequently to closure of said normally open switch; heating means for said heat-responsive means energized by closure of said normally open switch; and electrical circuit means, including said heating means, automatically acting in response to failure of said normally open switch to open after it has closed as aforesaid, to maintain said heat-responsive means energized thereby serving to prevent grounding of said ignition circuit by reason of said normally open switch being maintained closed.

7. In a control according to claim 5; said electrical circuit means comprising a resistance shunted around said normally closed switch, said resistance being of such ohmic value as to prevent undesired disabling of said ignition system when said normally open switch is closed and said normally closed switch is open while allowing sufficient flow of ignition current to said heating means so as to maintain said normally closed switch open as aforesaid.

8. In a control according to claim 6; said electrical circuit means comprising a resistance shunted around said normally closed switch, said resistance being of such ohmic value as to prevent undesired disabling of said ignition system when said normally open switch is closed and said normally closed switch is open while allowing sufficient flow of ignition current to said heating means so as to maintain said normally closed switch open as aforesaid.

9. In a drive for a motor vehicle having an engine provided with an ignition system; transmission means comprising change speed mechanism adapted for manipulation to change the vehicle speed ratio drive; switch means; means for operating said switch means; an interrupter switch operable to opened and closed positions independently of operation of said switch means; grounding circuit means including said switch means and said interrupter switch in series with each other for rendering said ignition system inoperative; means operable to effect said manipulation of said transmission means; means for operating said interrupter switch from an open position thereof to a closed position thereof as an incident to operation of said transmission manipulating means for establishing said circuit means when said switch means is closed; thermo-responsive switch means interposed in said grounding circuit means and operable from a closed position thereof to an open position thereof to open said grounding circuit means with said interrupter switch in its said closed position and said switch means closed; and electrical circuit means automatically operating after said interrupter switch has been operated to, and maintained for a predetermined time interval in, its said closed position for maintaining said thermo-responsive switch means in its said open position as long as said switch means and said interrupter switch remain closed.

10. In a drive for a motor vehicle having an engine provided with an ignition system; transmission means comprising change speed mechanism adapted for manipulation to change the vehicle speed ratio drive; switch means; means for operating said switch means; an interrupter switch operable to opened and closed positions independently of operation of said switch means; grounding circuit means including said switch means and said interrupter switch in series with each other for rendering said ignition system inoperative; means operable to effect said manipulation of said transmission means; means for operating said interrupter switch from an open position thereof to a closed position thereof as an incident to operation of said transmission manipulating means for establishing said circuit means when said switch means is closed; thermo-responsive switch means interposed in said grounding circuit means and operable from a closed position thereof to an open position thereof to open said grounding circuit means with said interrupter switch in its said closed position and said switch means closed; a resistance; and electrical circuit means including said resistance, said interrupter switch, and said switch means, operating to maintain said thermo-responsive switch means in its open position as long as said switch means and said interrupter switch remain closed.

11. In a control for an ignition system of an internal combustion engine; electrically operating means for momentarily disabling said ignition system including a pair of series-arranged switches; one of said switches being adapted under normal conditions for successive opening and closing operations thereby to effect said momentary disabling of said ignition system; heat-responsive means for so operating the other of said switches as to render said one switch incapable of effecting said disabling of said ignition system; heating means for said heat-responsive means energized by operation of said one switch; and electrical circuit means operating to maintain said heating means energized and therefore said heat-responsive means operated as aforesaid in the event that said one switch fails under said normal conditions to operate to restore the ignition system to normal operation.

12. In a control for an ignition system of an internal combustion engine; normally open switch means; a grounding circuit for momentarily disabling said ignition system and including at least a part of said normally open switch means and a normally closed switch; said normally closed switch and at least said part of said normally open switch means being arranged in series with each other in said grounding circuit; said normally open switch means being adapted for successive closing and opening movements whereby to effect said momentary disabling of said ignition system; heat-responsive means for opening said normally closed switch; heating means for said heat-responsive means energized by closure of said normally open switch means; and electrical circuit means, including said heating means, operating to maintain said heat-responsive means energized and therefore said normally closed switch open as long as said normally open switch means remains closed.

13. In a control for an ignition system of an internal combustion engine; normally open switch means; a grounding circuit for momentarily disabling said ignition system and including at least a part of said normally open switch means and a normally closed switch; said normally closed switch and at least said part of said normally open switch means being arranged in series with each other in said grounding circuit; said normally open switch means being adapted for successive closing and opening movements whereby to effect said momentary disabling of said ignition system; heat-responsive means for opening said normally closed switch; heating means for said heat-responsive means energized by closure of said normally open switch means; and electrical circuit means, including said heating means, automatically acting in response to failure of said normally open switch means to open after it has closed as aforesaid, to maintain said heat-responsive means energized thereby serving to prevent grounding of said ignition circuit by reason of said normally open switch means being maintained closed.

14. In a control for an ignition system of an internal combustion engine; electrically operating means for momentarily disabling said ignition system including two switch means at least a part of one being arranged in series with the other; said one of said switch means being adapted under normal conditions for successive opening and closing operations thereby to effect said momentary disabling of said ignition system; heat-responsive means for so operating the other of said switch means as to render said one switch means incapable of effecting said disabling of said ignition system; heating means for said heat-responsive means energized by operation of said one switch means; and electrical circuit means operating to maintain said heating means energized and therefore said heat-responsive means operated as aforesaid in the event that said one switch means fails under said normal conditions to operate to restore the ignition system to normal operation.

15. In a drive for a motor vehicle having an engine; transmission mechanism operable to provide a drive from the engine to the vehicle, said mechanism including positively engageable drive-control elements cooperable for relative engagement therebetween to establish said drive and for relative disengagement to release said drive, said elements when relatively engaged being subject to thrust-transmission therebetween during said drive so as to resist relative disengagement thereof to release said drive until said thrust-transmission is relieved; an ignition system for said engine adapted to be interrupted to relieve said thrust-transmission; thrust-transmitting means operable to urge relative disengagement of said elements as aforesaid; grounding circuit means adapted, when completed, to ground said ignition system by causing current flow from said ignition system to ground, thereby effecting said interruption; control means operable to effect completion of said grounding circuit means so as to accommodate relative disengagement of said elements by said thrust-transmitting means, normally automatically followed by opening of said grounding circuit means within a predetermined time interval in response to relative disengaging movement of said elements thereby to effect restoration of said ignition system to normal operation; means responsive to said flow of current through said grounding circuit means beyond said predetermined time interval for effecting opening of said grounding circuit means thereby to effect restoration of said ignition system to operation upon failure of said control means to open said grounding circuit means and means for thereafter holding open said grounding circuit means to maintain the operative condition of the ignition system.

VICTOR E. MATULAITIS.